(12) United States Patent
Daude et al.

(10) Patent No.: US 11,581,720 B2
(45) Date of Patent: Feb. 14, 2023

(54) ASSEMBLY COMPRISING A CABLE AND A SUPPORT FOR SAID CABLE

(71) Applicant: JEHIER, Chemille (FR)

(72) Inventors: Adrien Daude, Vallet (FR); Adelin Renou, Chemille (FR); Pierre Augereau, Maizieres en Mauges (FR)

(73) Assignee: JEHIER, Chemille (FR)

( * ) Notice: Subject to any disclaimer, the term of this patent is extended or adjusted under 35 U.S.C. 154(b) by 0 days.

(21) Appl. No.: 16/955,981

(22) PCT Filed: Dec. 21, 2017

(86) PCT No.: PCT/FR2017/053794
§ 371 (c)(1),
(2) Date: Oct. 28, 2020

(87) PCT Pub. No.: WO2019/122543
PCT Pub. Date: Jun. 27, 2019

(65) Prior Publication Data
US 2021/0075204 A1   Mar. 11, 2021

(51) Int. Cl.
*H02G 3/32* (2006.01)
*F16B 5/06* (2006.01)
(Continued)

(52) U.S. Cl.
CPC ............ *H02G 3/32* (2013.01); *F16B 5/0685* (2013.01); *F16L 3/1033* (2013.01);
(Continued)

(58) Field of Classification Search
CPC .. H02G 3/32; H02G 3/263; H01B 7/14; F16L 3/1033; F16L 3/1058; F16L 3/223; F16B 5/0685; B60R 16/0215; B60R 16/08
See application file for complete search history.

(56) References Cited

U.S. PATENT DOCUMENTS 3,894,706 A * 7/1975 Mizusawa ............... F16L 3/237
                                                         248/68.1
3,954,238 A * 5/1976 Nivet ......................... F16L 3/13
                                                         248/68.1
(Continued)

FOREIGN PATENT DOCUMENTS

GB    2 158 143 A     11/1985
GB    2166794 A  *  5/1986  ................ F16L 3/13
(Continued)

OTHER PUBLICATIONS

International Search Report and Written Opinion for Application No. PCT/FR2017/053794 dated Jul. 5, 2018, 22 pages.

*Primary Examiner* — Tan Le
(74) *Attorney, Agent, or Firm* — Alston & Bird LLP

(57) ABSTRACT

The present disclosure relates to an assembly having a cable support and a cable inserted in the support, the latter may include:
 at least one base, made of a rigid material, having at least one receptacle provided with a longitudinal axis and, of which the inner dimension $D_{int}$ is given, and
 at least one strap, made of a material more flexible than that of the base, having at least two lips on the one hand arranged opposite one another to define a slot for the passage of a cable between the lips and on the other hand, shaped to define an orifice, wherein the cable is inserted, this orifice, provided with a longitudinal axis, communicating with the slot along this longitudinal axis of the orifice, the lips having, together, an outer dimension $D'_{ext}$ equal or greater than the inner dimension of the receptacle.

16 Claims, 5 Drawing Sheets

(51) Int. Cl.
*F16L 3/10* (2006.01)
*F16L 3/22* (2006.01)
*H02G 3/10* (2006.01)
*F16B 2/20* (2006.01)

(52) U.S. Cl.
CPC ............... *F16L 3/1058* (2013.01); *F16B 2/20* (2013.01); *H02G 3/10* (2013.01)

(56) References Cited

U.S. PATENT DOCUMENTS

| | | | | |
|---|---|---|---|---|
| 4,799,641 | A * | 1/1989 | Koreski | F16L 3/2235 24/329 |
| 5,002,243 | A | 3/1991 | Kraus et al. | |
| 5,033,701 | A | 7/1991 | Kraus | |
| 6,809,257 | B2 * | 10/2004 | Shibuya | B60R 16/0215 174/481 |
| 7,037,775 | B2 * | 5/2006 | Cho | H01L 21/28525 257/E21.166 |
| 7,201,352 | B2 * | 4/2007 | Kawai | F16L 3/1075 248/74.1 |
| 7,559,511 | B2 * | 7/2009 | Yon | F16L 3/2235 174/135 |
| 2007/0018057 | A1 | 1/2007 | Kovac | |
| 2010/0243855 | A1 | 9/2010 | Sampson | |
| 2014/0157557 | A1 | 6/2014 | Diep et al. | |
| 2015/0233495 | A1 | 8/2015 | Shinoda | |

FOREIGN PATENT DOCUMENTS

| | | |
|---|---|---|
| JP | S63 8488 U | 1/1988 |
| JP | A-H10-136539 | 5/1998 |
| JP | A-2011-7256 | 1/2011 |
| WO | WO 93/17469 A1 | 9/1993 |
| WO | WO 2015/029957 A1 | 3/2015 |

\* cited by examiner

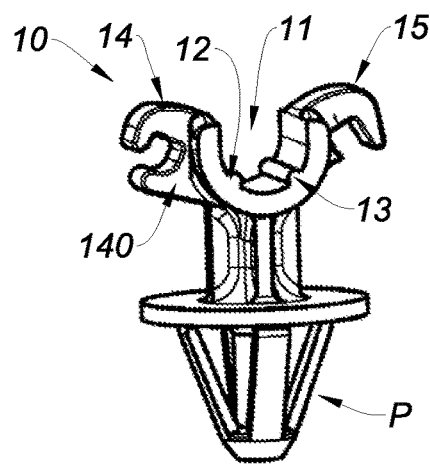
Fig. 1(e)
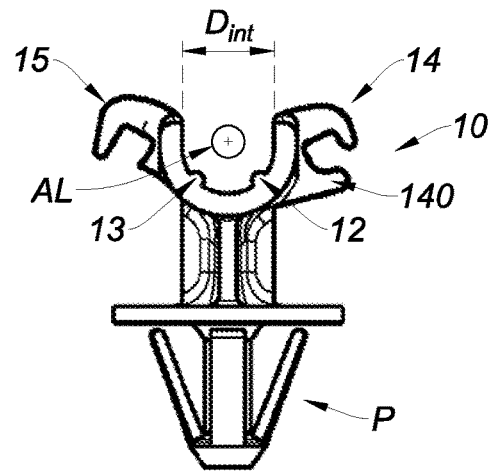
Fig. 1(f)
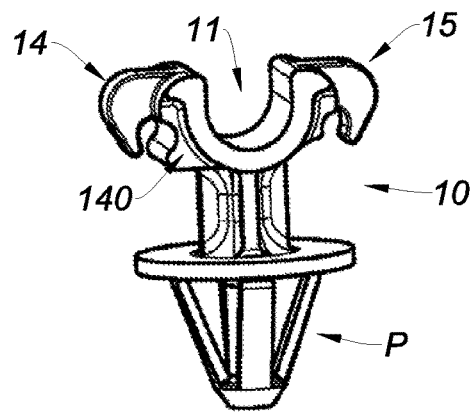
Fig. 2(c)
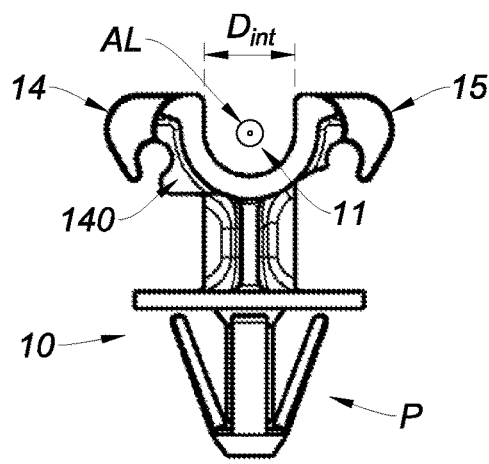
Fig. 2(d)
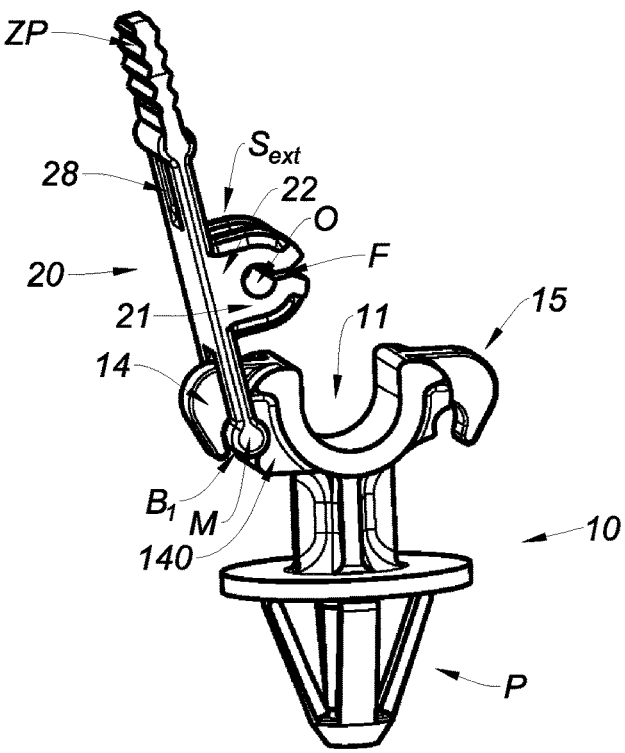
Fig. (2e)

ASSEMBLY COMPRISING A CABLE AND A SUPPORT FOR SAID CABLE

CROSS-REFERENCE TO RELATED APPLICATIONS

This application is a national stage application filed under 35 U.S.C. § 371 of International Application No. PCT/FR2017/053794 filed on Dec. 21, 2017 and entitled "Assembly comprising a cable and a support for said cable", which application is hereby incorporated by reference in its entirety.

The present invention relates to a support for a cable.

By cable, is meant an electric cable, which could for example, be used as a power supply, or also an optical cable like an optical fibre, which can in particular be used for transmitting information. Whatever the type of cable, this can have a sensor function or comprise one or more sensors.

Such a support can in particular be used for an aeronautical application.

There are numerous cable supports.

In practice, cable supports are encountered based on metal or plastic cable clamps, hinges or clips.

These different solutions are not completely satisfactory.

The invention aims to propose an improved solution.

The invention proposes, for this purpose, an assembly comprising a cable support and a cable inserted in said support, the latter comprising:

at least one base, made of a rigid material, comprising at least one receptacle provided with a longitudinal axis and of which the inner dimension $D_{int}$, taken in a plane perpendicular to said longitudinal axis, is given, at least one strap, made of a material more flexible than that of the base, comprising at least two lips, on the one hand arranged opposite one another to define a passage slot for a cable between said lips and, on the other hand, shaped to define an orifice in which said cable is inserted, this orifice, provided with a longitudinal axis, communicating with said slot along this longitudinal axis of the orifice, said lips having, together, an outer dimension $D'_{ext}$, taken in a plane perpendicular to the longitudinal axis of the orifice, equal to or greater than the inner dimension of the receptacle.

The fastening according to the invention may comprise one or more of the following features, taken individually or in combination:

at least one of the lips is provided with a bevel between an outer surface of said lip and the slot;

each lip comprises an outer groove extending along the longitudinal axis of the orifice and the receptacle comprises two protrusions extending along the longitudinal axis of the receptacle, the arrangement and the sizes of said protrusions corresponding to the arrangement and to the dimensions of the grooves such that, when the lips are inserted in the receptacle, the protrusions of the receptacle can be inserted in the grooves of said lips;

said at least one strap is removable;

said at least one base comprises, on either side of the receptacle, a hook and said at least one strap comprises, on either side of the lips, an opening of which an edge is capable of engaging with a corresponding hook of the receptacle;

at least one of said edges capable of engaging with the corresponding hook of the receptacle comprises a stiffening means;

said at least one strap comprises at least one gripping zone for a user;

said at least one base comprises at least two receptacles and a strap according to the invention associated with each receptacle;

said at least one base comprises at least two receptacles and a common strap for the two receptacles, said common strap having two pairs of lips according to the invention, each pair of lips being intended to engage with one of the two receptacles;

the material forming said at least one strap is an elastomer of Shore A hardness comprised between 40 and 85 or a thermoplastic elastomer of Shore A hardness comprised between 40 and 85;

said elastomer of Shore A hardness comprised between 40 and 85 is selected from among: silicone, butadiene acrylonitrile, fluoroelastomer, in particular fluorosilicone, polyacrylic elastomer, polychloroprene, acrylic, chlorosulfonated polyethylene, ethylene-propylene copolymer, polyurethane, natural elastomer;

said thermoplastic elastomer of Shore A hardness comprised between 40 and 85 is a polyurethane thermoplastic;

the material forming said at least one base is a thermoplastic;

the thermoplastic material of the base is selected from among: polyetheretherketone, polyimides, polyetherketoneketone, polyamides, phenylene polysulphide, polyphenylsulfone, polytetrafluroroethylene, polyvinylidene fluoride, chlorotrifluoroethylene ethylene, polyethylene, polypropylene;

the material forming said at least one base is polyetheretherketone and the material forming said at least one strap is a silicon of Shore A hardness comprised between 40 and 85, advantageously between 50 and 70;

the material forming said at least one base is polyamide and the material forming said at least one strap is polyurethane, of Shore A hardness comprised between 40 and 85.

The invention will be better understood and other details, features and advantages of the invention will appear upon reading the following description provided as a non-limiting example and in reference to the appended drawings, in which:

FIG. 1, which comprises FIGS. 1(a) to 1(f), represents in FIG. 1(a), a cable support according to a first embodiment of the invention, in FIGS. 1(b) to 1(d), different views of a strap forming part of the cable support of FIG. 1(a) with in particular, the presence of the cable in the support in FIG. 1(d) and, in FIGS. 1(e) and 1(f), different views of a base forming part of the cable support of FIG. 1(a);

FIG. 2, which comprises FIGS. 2(a) to 2(e), represents in FIG. 2(a), as well as in FIG. 2(e), a cable support according to a second embodiment of the invention, with the presence of the cable in the support in FIG. 2(a); in FIG. 2(b), a strap forming part of the cable support of FIGS. 2(a) and 2(e) and, in FIGS. 2(c) and 2(d), a base forming part of the cable support of FIGS. 2(a) and 2(e);

Figure 1A:
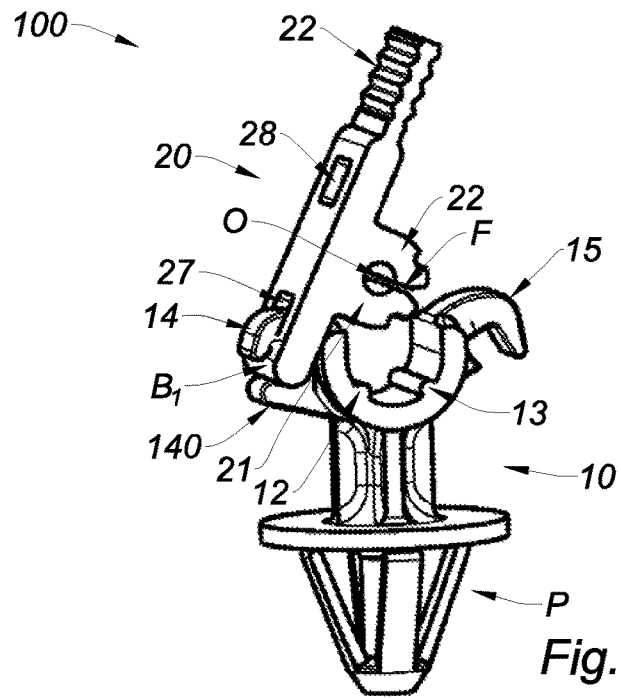
Figure 1B:
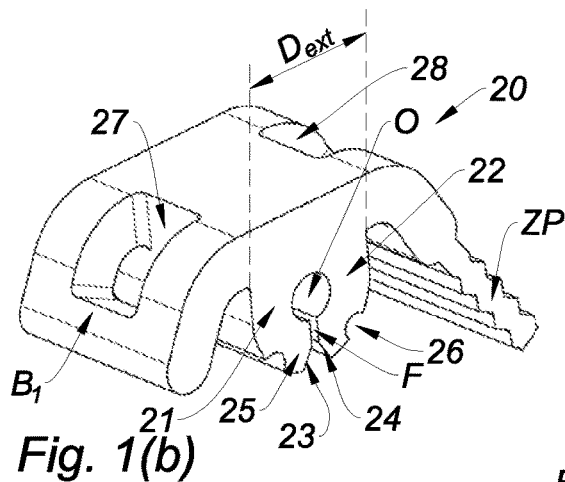
Figure 1C:
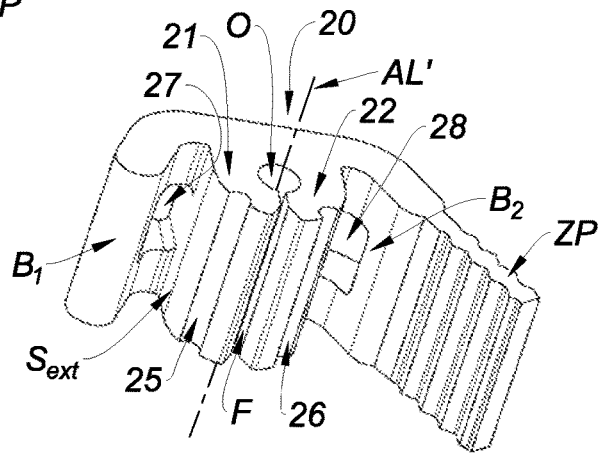
Figure 1D:
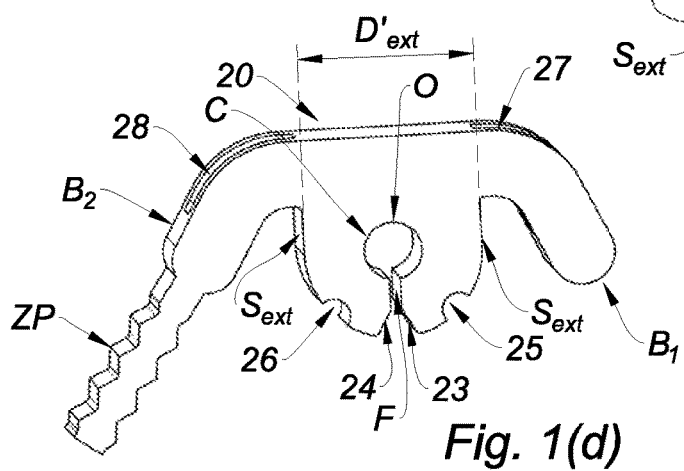

The invention relates to an ESB assembly comprising a cable and a support 100, 100', 100", 100''' of cable C in which the cable C is inserted. Several embodiments of this ESB assembly, corresponding to several possible embodiments of the cable support, are presented below.

First, the structure of a first embodiment of a cable support according to the invention will be described, in support of FIGS. 1(*a*) to 1(*f*).

The cable support 100 represented in FIG. 1 comprises at least one base 10, made of a rigid material, and at least one strap 20 made of a more flexible material than that of the base.

The base 10 comprises at least one receptacle 11 provided with a longitudinal axis AL and of which the inner dimensions $D_{int}$, taken in a plane perpendicular to said longitudinal axis AL are given. The base 10 may comprise a foot P, which may be clipped in a fixed support (not shown in FIG. 1, but which can be seen in FIG. 5) outside of the support 100 according to the invention.

Said at least one strap 20 comprises at least two lips 21, 22 arranged opposite one another to define a slot F for the passage of a cable between said lips 21, 22. Moreover, these lips are shaped to define an orifice O for supporting said cable. The orifice O is provided with a longitudinal axis AL' and communicates with the slot F along this longitudinal axis AL'.

The lips 21, 22 define, together, after installation of the cable in the orifice O, a dimension $D'_{ext}$ taken in a plane perpendicular to the longitudinal axis AL' of the orifice O, which is equal or advantageously larger than the inner dimension $D_{int}$ of the receptacle 11.

From a practical standpoint, this may be obtained by providing lips 21, 22, which define together, an outer dimension $D_{ext}$, taken in a plane perpendicular to the longitudinal axis AL' of the orifice O before the insertion of the cable in the orifice O, equal to or advantageously larger than the inner dimension $D_{int}$ of the receptacle 11. Once the cable is inserted in the orifice O, an outer dimension $D'_{ext}$ is thus defined, such that $D'_{ext} \geq D_{ext}$.

Also, from a practical standpoint, this may, in a variant, be obtained when said dimension $D_{ext}$ of the lips 21, 22 is less than the inner dimension $D_{int}$ of the receptacle, but the dimension $D'_{ext}$ is greater than or equal to this inner dimension $D_{int}$. Indeed, the cable C, according to its geometry and its nature, can have the effect, during its insertion in the orifice O and before the insertion of the lips 21, 22 in the receptacle 11, of deforming the lips to make them go from an outer dimension $D_{ext}$ to a dimension $D'_{ext}$.

Thus, in both cases, once the cable is inserted in the orifice O, the insertion of the lips 21, 22 of the strap 20 in the receptacle 11 involves a deformation of the lips 21, 22, due to their outer dimension $D'_{ext}$ being equal to or greater than the inner dimension $D_{int}$ ($D_{ext}' \geq D_{int}$) of the receptacle.

The lips 21, 22 of the strap 20 are thus inserted with force in the receptacle 11 of the base 10.

Moreover, once the lips 21, 22 are inserted in the receptacle, the deviation of the lips 21, 22 is prevented by the receptacle 11, which prevents the exit of the cable from the orifice O.

This involves two consequences.

The first consequence is that any deviation of the lips 21, 22 is prevented by the receptacle 11 to the extent that the cable is blocked in the orifice O. Therefore, in use, the exit of the cable from this orifice O is avoided or limited.

The second consequence is that the lips 21, 22 are maintained in the receptacle 11.

Maintenance of the lips 21, 22 in the receptacle 11 can be improved.

For this purpose, and as far as the embodiment of FIG. 1 is concerned, each lip 21, 22 comprises an outer groove 25, 26 extending along the longitudinal axis AL' of the orifice O and the receptacle 11 comprises two protrusions 12, 13 extending along the longitudinal axis AL of the receptacle 11. The arrangement of the protrusions 12, 13 corresponds to the arrangement of the outer grooves 25, 26. Moreover, the transversal dimension (i.e. a dimension taken transversally to the longitudinal axis AL of the receptacle 11) of the protrusions 12, 13 corresponds to or is advantageously greater than the transversal dimension (i.e. a dimension taken transversally to the longitudinal axis AL' of the orifice O) of the corresponding outer grooves 25, 26. Thus, the engagement of the protrusions 12, 13 and outer grooves 25, 26 brings an additional maintaining or blocking which contributes to avoiding the removal, in use, of the lips 21, 22 of the receptacle 11 from the base 10.

Maintenance of the lips 21, 22 in the receptacle 11 can also be improved.

For this purpose, it is possible to attach the strap 20 to the base 10 with complementary means. Thus, and advantageously, said at least one base 10 comprises, on either side of the receptacle 11, a hook 14, 15 and said at least one strap 20 comprises, on either side of the lips 21, 22, an opening 27, 28 comprising an edge B1, B2 capable of engaging with a corresponding hook 14, 15 of the receptacle 11. These complementary means allow the extension of the strap 20, in a direction substantially perpendicular to that defined by the longitudinal axis AL' of the orifice O. It is understood that this tensioning is made possible due to the strap 20 being more flexible than the base 10.

The complementary means described above are an implementation example for a removable strap 20.

There could be an alternative if the strap was not removable.

It must, however, be noted that when the strap 20 is removable, the base 10 provides a counteracting hook 140 allowing, with the hook 14, to define a housing wherein the edge B1 of the strap 20 is blocked (except for in the case of forced mechanical action of a user). Thus, the loss of the strap 20 is avoided.

Moreover, in order to facilitate the installation of said at least one strap 20 on the base 10, a gripping zone ZP for a user is provided on the strap 20. When the strap 20 provides complementary means such as described above, the gripping zone is advantageously situated at an end of the strap 20.

Furthermore, at least one of the lips 21, 22, and advantageously as represented in FIG. 1, each lip 21, 22 is provided with a bevel 23, 24 between an outer surface Sext of said lip 21, 22 and the slot F. The or each bevel 23, 24 facilitates the insertion of the cable in the orifice O.

A second embodiment of a cable support 100' according to the invention will now be described, in support of FIGS. 2(*a*) to 2(*c*).

The support 100' according to the second embodiment is distinguished from the support 100 according to the first embodiment by the absence of grooves on the outer surface Sext of the lips 21, 22.

However, and contrary to the first embodiment, the lips 21, 22 each have a variable thickness along the direction defined by the longitudinal axis AL' of the orifice O. Thus, in FIG. 2(*b*), by following the directions defined by this longitudinal axis AL', the presence of two protrusions R1, R2 separated by a hollow zone ZC can be observed. This is the same on the other lip 22. Contact between the lips 21, 22 and the receptacle 11 is therefore made by way of these protrusions R1, R2. This geometry defines damping zones, namely the protrusions R1, R2 between the lips 21, 22 and the receptacle. This damping is of interest in environments where the support and consequently the cable are subjected to vibrations. Indeed, if the flexible character of the strap protects the strap from vibrations, the damping effect provided by the protrusions R1, R2 separated by a hollow zone ZC improves this protection.

Moreover, the strap 20 being more flexible than the base 10, which itself is rigid, it may be advantageous to provide that at least one of the edges B1, B2 of the strap 20 which is capable of engaging with the corresponding hook 14, 15 of the receptacle 11 comprises a stiffening means M.

Figure 2A:
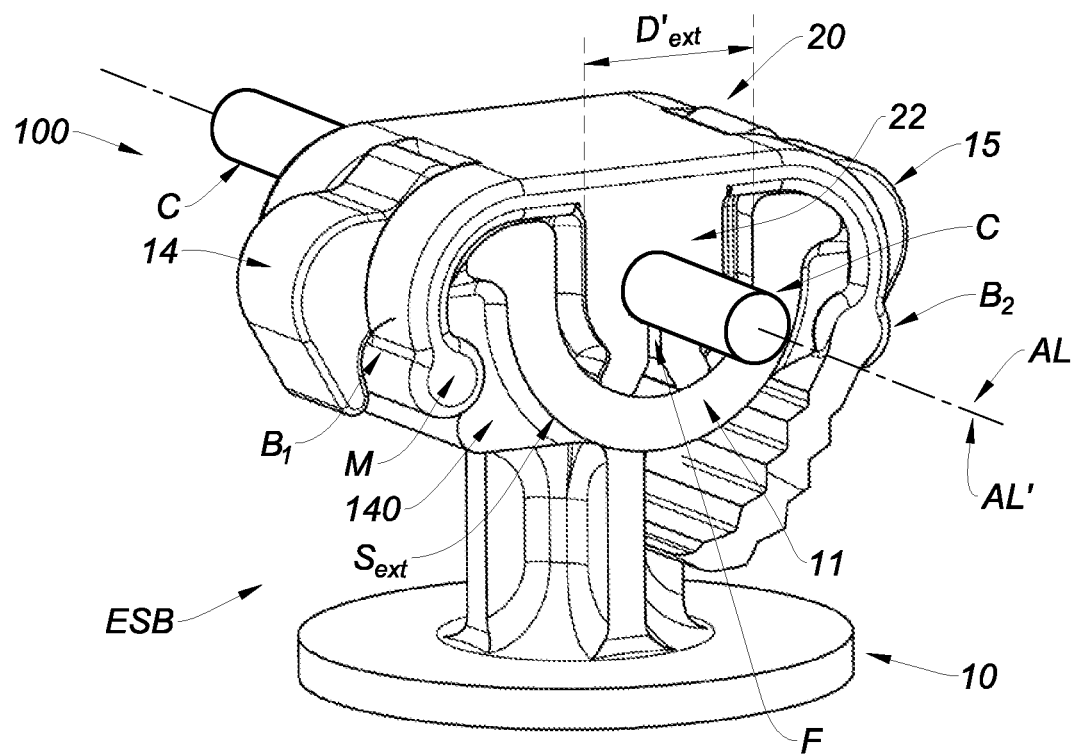
Figure 2B:
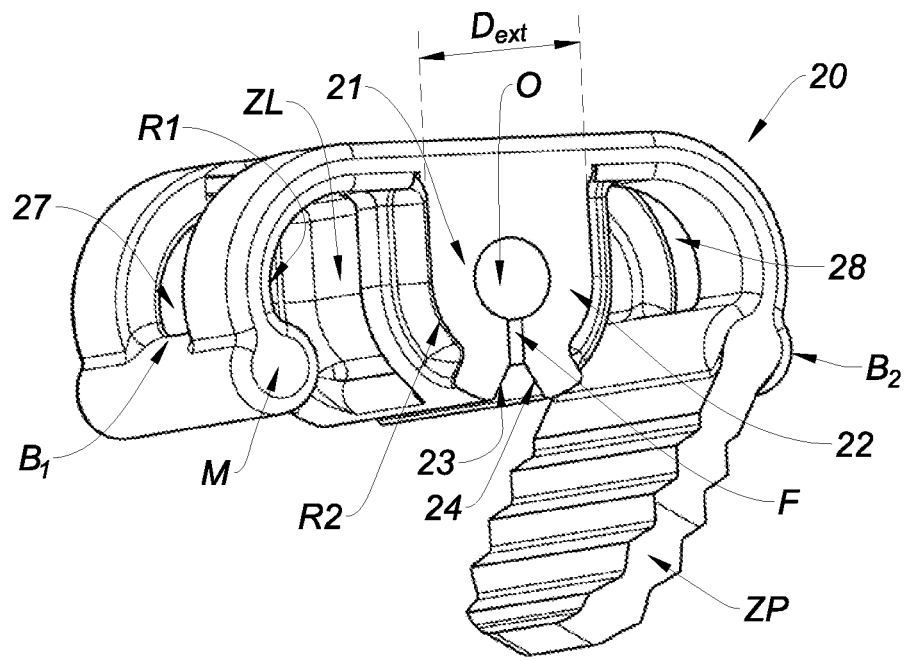

This possibility is represented in FIG. 2 but could equally be implemented with the first embodiment.

It is understood that this stiffening is only localised, in this case, at the level of the edge B1, B2 in question. This stiffening means M can be obtained by playing on the geometry of the edge (greater thickness than the remainder of the strap, in particular), as is moreover the case in FIG. 2. In a variant, to define this stiffening means M, it may be considered to locally increase the density of the strap 20 at the level of the edge B1, B2 in question, for example by providing an insert, made of a denser material than the material forming the strap 20.

Figure 3:
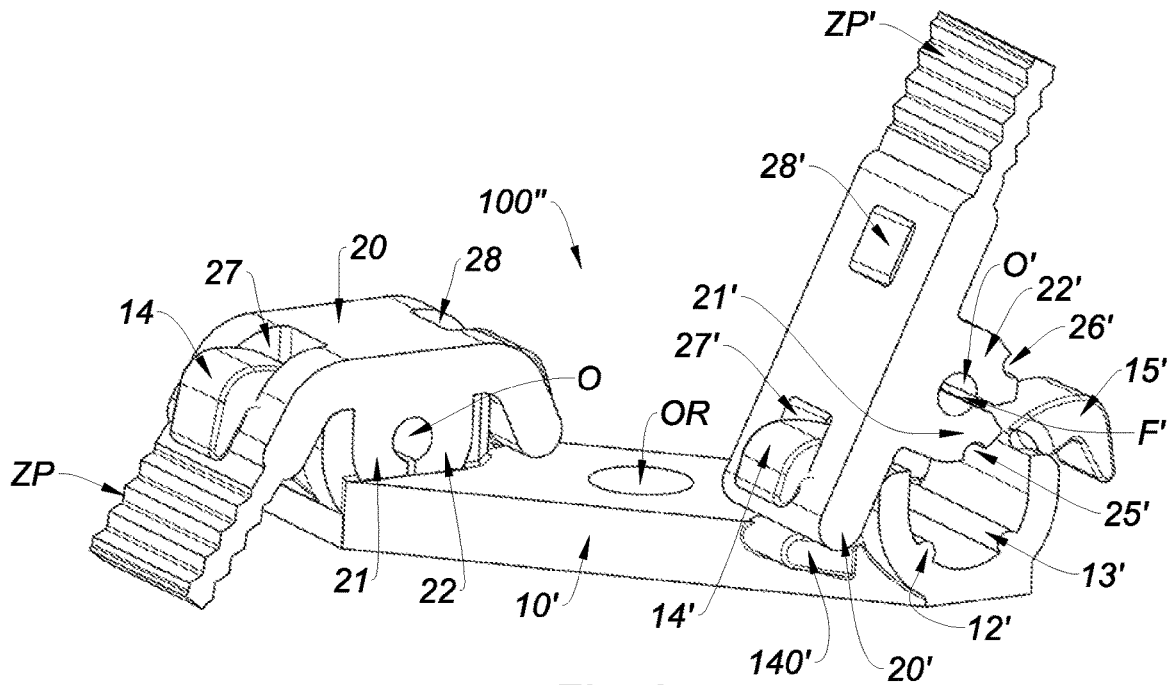
FIG. 3 represents a third embodiment of a cable support according to the invention, capable of supporting two cables.

A third embodiment of a cable support according to the invention will now be described in support of FIG. 3.

Here, the support 100″ comprises at least one base 10 which comprises at least two receptacles 11, 11′ and a strap 20, 20′ associated with each receptacle 11, 11′.

In the case illustrated here, the receptacle 11 and the strap 20 both correspond to the receptacle and to the strap described above in support of FIG. 2.

However, the base 10′, taken in its entirety, is modified with respect to the first embodiment, to receive an additional receptacle 11′, which is provided with protrusions 12′, 13′ according to the protrusions 12, 13 of the second embodiment and provided with hooks 14′, 15′ according to the hooks 14, 15 of the second embodiment.

Moreover, a strap 20′ according to the strap 20 of the second embodiment is associated with the receptacle 11′ and therefore comprising lips 21′, 22′ defining a slot F′ and an orifice O′, outer grooves 25′, 26′ to engage with the protrusions 12′, 13′ of the receptacle 11′ respectively, openings 27′, 28′ for the hooks 14′, 15′ respectively as well as a gripping zone ZP′ for a user.

Each receptacle 11, 11′ is advantageously installed at the ends of the base 10′. An orifice OR is provided on the base 10′ between the receptacles 11, 11′ to make a fastening means pass through them, for example a bolt or a screw, allowing the attachment of the base 10′ on a fixed support outside the support 100″ according to the invention.

Moreover, each receptacle may be installed to ensure that the longitudinal axes of the orifices O and O′ are parallel. In this case, two parallel cables can be installed.

Figure 4:
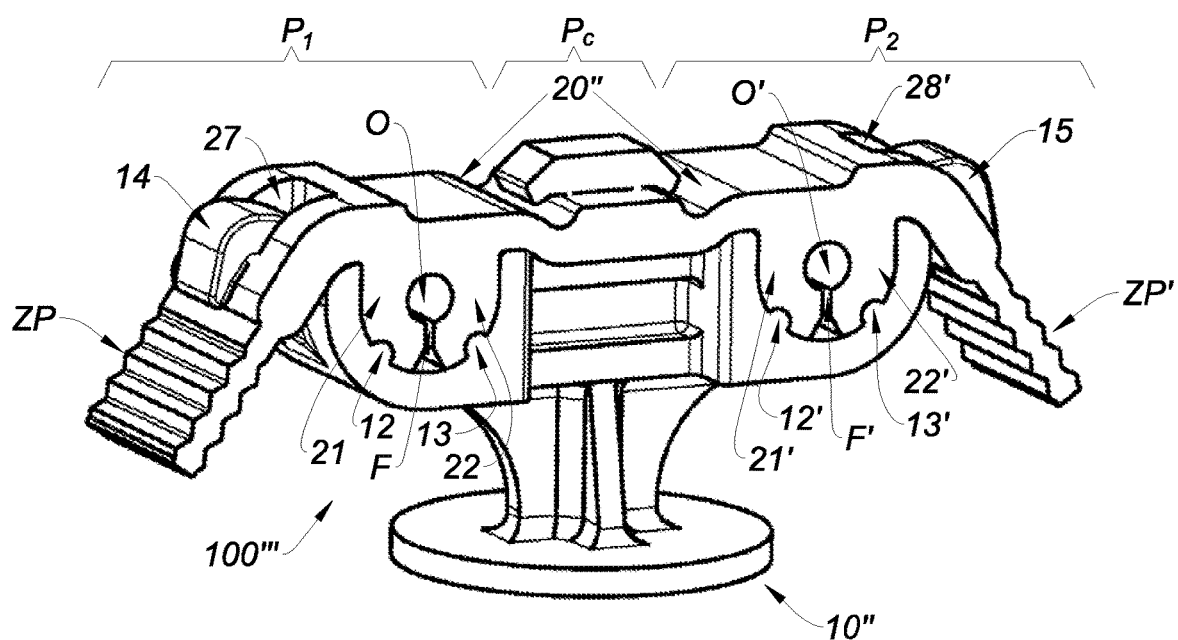
FIG. 4 represents a fourth embodiment of a cable support according to the invention, also capable of supporting two cables.
Figure 5A:
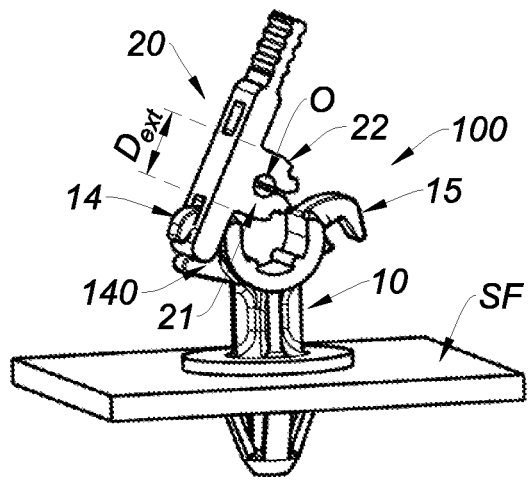
FIG. 5 represents different steps of a method for mounting a cable in a support according to the invention, in this case, the support of FIG. 1.
Figure 5B:
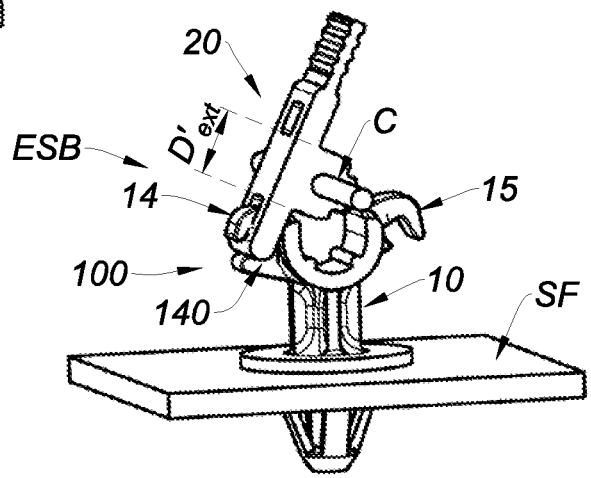
Figure 5C:
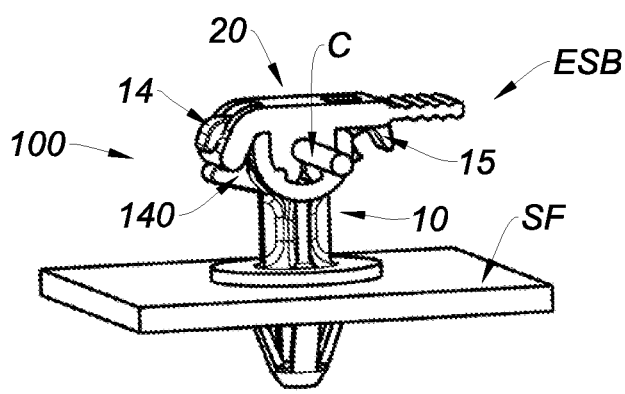
Figure 5D:
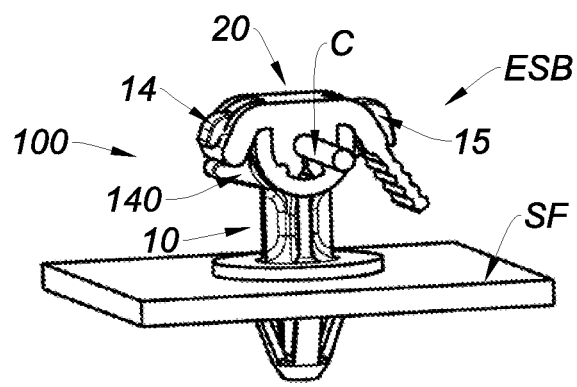

Finally, FIG. 4 represents a fourth embodiment of a cable support according to the invention.

In this embodiment, the support 100′″ comprises at least one base 10″ provided with at least two receptacles 11, 11′ and a common strap 20″ for the two receptacles.

The receptacles 11, 11′ correspond to the receptacles 11, 11′ described above in support of FIG. 3.

The strap 20″ is however common to the two receptacles 11, 11′.

Thus, the strap 20″ has two pairs of lips 21, 22 on the one hand, and 21′, 22′ on the other hand, each pair of lips being intended to engage with one of the two receptacles 11, 11′. The lips 21, 22 are identical to those which have been described above in support of FIG. 1 or 3. Moreover, the lips 21′, 22′ correspond to the lips 21, 22.

More generally, the strap 20″ can be presented in three portions. A first portion P1 and a second portion P2, situated at the opposite ends of the strap 20″ and a central portion Pc connecting the second portion P2 to the first portion P1. Each portion P1, P2 of the strap 20″ is similar to a strap 20, such as described, for example, with FIG. 2, but with one single opening, namely the opening 27 for the first portion P1 and the opening 28′ for the second portion P2. Indeed, because the central portion Pc connects the second portion P2 to the first portion P1, it is not necessary to provide more openings.

Nevertheless, in this embodiment, like for all the others, a strap provides an opening by hooking of the base, when this fastening method is provided.

Moreover, always due to the presence of a central portion PC of the strap 20″, it is advantageous to provide a base 10″ provided with a clippable foot, as in FIG. 2.

Regardless of the embodiment considered, the base is made of a rigid material and the strap is made of a more flexible material than that of the base. The rigidity of the base allows a secure fit of the support according to the invention on the fixed support (not represented) on which it is intended to be mounted. The flexibility of the strap allows its deformation such that it can be inserted in the receptacle of the base and ensure a certain maintaining. This flexibility also protects (mechanically, less friction) the cable intended to be housed in the orifice formed between the lips of the strap. This flexibility also allows a better protection of the cable against possible vibrations, which is in particular of interest for aeronautical applications.

More specifically, the rigid base 10, 10′, 10″, can be made of a thermoplastic material. This is advantageous in environments subjected to high temperatures as thermoplastics do not conduct heat very well.

This thermoplastic material for the base may be selected from among: polyetheretherketone (PEEK), polyimides (PI), polyetherketoneketone (PEKK), polyamides (PA), phenylene polysulphide (PPS), polyphenylsulfone (PPSU), polytetrafluroroethylene (PTFE), polyvinylidene fluoride (PVDF), chlorotrifluoroethylene ethylene (E-CTFE), polyethylene (PET), polypropylene (PP).

More specifically also, the strap 20, 20′, 20″ may be made of elastomer (E) of Shore A hardness comprised between 40 and 85 or made of thermoplastic elastomer (TPE) of Shore A hardness comprised between 40 and 85. The choice of this type of material (elastomer, thermoplastic elastomer) is advantageous in environments subjected to high temperatures, as they do not conduct heat very well. Moreover, the choice of the Shore A hardness also improves maintenance of the cable in the orifice formed between the lips, statically but also when the support is subjected to vibrations linked to its installation environment. Moreover, the choice of this Shore A hardness also improves maintenance of said lips in the receptacle of the base when the support is subjected to vibrations linked to its installation environment.

When an elastomer of Shore A hardness comprised between 40 and 85 is considered for the strap 20, 20′, 20″, this elastomer may be selected from among: silicone, butadiene acrylonitrile (NBR), fluoroelastomer, in particular fluorosilicone, polyacrylic elastomer (ACM), polychloroprene (CR), acrylic, chlorosulfonated polyethylene, ethylene-propylene copolymers, polyurethane (PU), natural elastomer (NR).

When a thermoplastic elastomer (TPE) of Shore A hardness comprised between 40 and 85 is considered, this thermoplastic elastomer may be a thermoplastic polyurethane (TPU).

In particular, it may be provided, for demanding applications, in particular at a high temperature, that the material forming said at least one base 10, 10', 10" be polyetheretherketone (PEEK) and the material forming said at least one strap 20, 20', 20" be a silicone of Shore A hardness comprised between 40 and 85, advantageously between 50 and 70.

In particular, for less demanding applications, it may be provided that the material forming said at least one base 10, 10', 10" be polyamide (PA) and the material forming said at least one strap 20, 20', 20" be polyurethane (PU; elastomer), of Shore A hardness comprised between 40 and 85.

Regardless of the embodiment considered, a method for mounting a cable in a support 100, 100', 100", 100''' according to the invention can be implemented to obtain the ESB assembly, with a support according to the invention, comprising the following steps:

a) mounting the base 10, 10', 10" on a fixed support, outside said support according to the invention;

b) inserting the cable C in the orifice O, O' defined between the lips 21, 22, 21', 22' of said at least one strap 20, 20', 20", by way of the slot F, F';

c) inserting said lips 21, 22, 21', 22' of said at least one strap 20, 20', 20" in the receptacle 11, 11' of said at least one base 10, 10', 10".

This mounting method is represented by FIG. 5, with the support 100 of the first embodiment.

In FIG. 5(*a*), the base 10 is observed mounted on a fixed support SF, outside said support 100; namely after step a) and before step b).

In FIG. 5(*b*), the support 100 is observed, after step b) and before step c).

In FIG. 5(*c*), the support 100 is observed after step c).

As represented in FIG. 5(*d*), the strap 20 can then be fixed definitively using the hook 15 of the base 10.

Moreover, prior to step a), a step of mounting the strap 20 on the hook 14 of the base 10 can be provided, after the latter has been mounted on the fixed support SF to result in the configuration of FIG. 5(*a*).

In a variant, the configuration of FIG. 5(*a*) cannot be encountered. It is, for example, the case if step b) is carried out before mounting the strap 20 on the hook 14 to result in the configuration of FIG. 5(*b*). This is compatible with the method described above in support of steps a), b) and c).

Furthermore, it is perfectly possible to switch the order of the steps.

Indeed, the method can be put in the following order: step b), then step c), then step a).

Indeed, also, the method can be put in the following order: step b), then step a), then step c).

The only requirement is that the cable C is inserted in the orifice O of the lips 21, 22, before the latter are inserted in the receptacle 11 of the base 10.

The invention claimed is:

1. An assembly comprising a cable support and cable inserted in said support, the latter comprising:

at least one base, made of a rigid material, comprising at least one receptacle provided with a longitudinal axis and, of which the inner dimension $D_{int}$, taken in a plane perpendicular to said longitudinal axis, is given, at least one strap, made of a more flexible material than that of the base, comprising at least two lips on the one hand arranged opposite one another to define a slot for the passage of a cable between said lips and on the other hand, shaped to define an orifice wherein said cable is inserted, this, being provided with a longitudinal axis, communicating with said slot along this longitudinal axis of the orifice, wherein said lips have, together with the cable inserted in the orifice, an outer dimension $D'_{ext}$ taken in a plane perpendicular to the longitudinal axis of the orifice, equal to or greater than the inner dimension of the receptacle, and wherein the slot defined by said lips is oriented towards the receptacle so that the slot is closed by the receptacle.

2. The assembly according to claim 1, wherein at least one of the lips is provided with a bevel between an outer surface of said lip and the slot.

3. The assembly according to claim 1, wherein:

each lip comprises an outer groove extending along the longitudinal axis of the orifice;

the receptacle comprises two protrusions extending along the longitudinal axis of the receptacle, the arrangement and the dimensions of said protrusions corresponding to the arrangement and to the dimensions of the grooves such that, when the lips are inserted in the receptacle, the protrusions of the receptacle can be inserted in the grooves of said lips.

4. The assembly according to claim 1, wherein said at least one strap is removable.

5. The assembly according to claim 1, wherein:

said at least one base comprises, on either side of the receptacle, a hook;

said at least one strap comprises, on either side of the lips, an opening of which an edge is capable of engaging with a corresponding hook of the receptacle.

6. The assembly according to claim 5, wherein at least one of said edges capable of engaging with the corresponding hook of the receptacle comprises a stiffening means.

7. The assembly according to claim 1, wherein said at least one strap comprises at least one gripping zone for a user.

8. The assembly according to claim 1, wherein said at least one base comprises at least two receptacles and a strap associated with each receptacle.

9. The assembly according to claim 1, wherein said at least one base comprises at least two receptacles and a common strap for the two receptacles, said common strap having two pairs of lips, each pair of lips being intended to engage with one of the two receptacles.

10. The assembly according to claim 1, wherein the material forming said at least one strap is an elastomer (E) of Shore A hardness comprised between 40 and 85 or a thermoplastic elastomer (TPE) of Shore A hardness comprised between 40 and 85.

11. The assembly according to claim 10, wherein said elastomer of Shore A hardness comprised between 40 and 85 is selected from among: silicone, butadiene acrylonitrile (NBR), fluoroelastomer, in particular fluorosilicone, polyacrylic elastomer (ACM), polychloroprene (CR), acrylic, chlorosulfonated polyethylene, ethylene-propylene copolymers, polyurethane (PU), natural elastomer (NR).

12. The assembly according to claim 10, wherein said thermoplastic elastomer of Shore A hardness comprised between 40 and 85 is a thermoplastic polyurethane (TPU).

13. The assembly according to claim 1, wherein the material forming said at least one base is a thermoplastic (TP).

14. The assembly according to claim 13, wherein said thermoplastic material of the base is selected from among: polyetheretherketone (PEEK), polyimides (PI), polyetherketoneketone (PEKK), polyamides (PA), phenylene polysulphide (PPS), polyphenylsulfone (PPSU), polytetrafluoroethylene (PTFE), polyvinylidene fluoride (PVDF), chlorotrifluoroethylene ethylene (E-CTFE), polyethylene (PET), polypropylene (PP).

15. The assembly according to claim 1, wherein:
the material forming said at least one base is polyetheretherketone (PEEK);
the material forming said at least one strap is a silicone of Shore A hardness comprised between 40 and 85, advantageously between 50 and 70.

16. The assembly according to claim 1, wherein:
the material forming said at least one base is polyamide (PA); and
the material forming said at least one strap is polyurethane, of Shore A hardness comprised between 40 and 85.

* * * * *

UNITED STATES PATENT AND TRADEMARK OFFICE
CERTIFICATE OF CORRECTION

| | | |
|---|---|---|
| PATENT NO. | : 11,581,720 B2 | Page 1 of 1 |
| APPLICATION NO. | : 16/955981 | |
| DATED | : February 14, 2023 | |
| INVENTOR(S) | : Adrien Daude et al. | |

It is certified that error appears in the above-identified patent and that said Letters Patent is hereby corrected as shown below:

In the Claims

In Column 9, Lines 1-2, Claim 14, delete "polytetrafluroroethylene" and insert -- polytetrafluoroethylene --, therefor.

Signed and Sealed this
Seventh Day of November, 2023

Katherine Kelly Vidal
*Director of the United States Patent and Trademark Office*